United States Patent
Burgarella et al.

[15] 3,699,861
[45] Oct. 24, 1972

[54] FLASH SYNCHRONIZATION CIRCUIT FOR SEQUENTIAL FIRING OF AN ARRAY OF FLASHBULBS

[72] Inventors: John P. Burgarella, Sudbury; Seymour Ellin, Chestnut Hill, both of Mass.

[73] Assignee: Polaroid Corporation, Cambridge, Mass.

[22] Filed: July 24, 1969

[21] Appl. No.: 844,470

[52] U.S. Cl............................................95/11.5
[51] Int. Cl........................G03b 9/70, H05b 41/00
[58] Field of Search............95/11.5, 10 C; 315/241 P

[56] References Cited

UNITED STATES PATENTS

| | | |
|---|---|---|
| 2,393,316 | 1/1946 | Edgerton................95/11.5 X |
| 2,538,577 | 1/1961 | McCarty.....................95/11.5 |
| 3,122,677 | 3/1964 | Fleider....................315/241 P |
| 3,340,426 | 8/1967 | Elliott.....................315/241 P |
| 3,518,487 | 6/1970 | Tanaka et al. ..........95/11.5 X |
| 3,522,763 | 8/1970 | Dietz.........................95/10 C |

*Primary Examiner*—John M. Horan
*Attorney*—Brown and Mikulka, William D. Roberson and Gerald L. Smith

[57] ABSTRACT

In a flash synchronization circuit, an array of flashbulbs are fired sequentially in synchronism with sequential actuations of the shutter mechanism. The shutter mechanism is opened and closed by electromagnets driven by Schmitt triggers. The sequential firing of the flashbulbs is controlled in response to signals derived from the Schmitt triggers and generated by the electromagnets.

17 Claims, 7 Drawing Figures

PATENTED OCT 24 1972 3,699,861

INVENTORS
JOHN P. BURGARELLA
and
SEYMOUR ELLIN

BY Brown & Mikulka and
Richard L. Aitken

ATTORNEYS

FLASH SYNCHRONIZATION CIRCUIT FOR SEQUENTIAL FIRING OF AN ARRAY OF FLASHBULBS

This invention relates to improved switching arrangements for photographic exposure control systems and, more particularly, to an improved photoflash synchronization circuit which may be used with an array of flashbulbs, the bulbs of which may be fired sequentially in synchronism with sequential actuations of a camera shutter.

BACKGROUND OF THE INVENTION

Photographic cameras incorporating automatic exposure control systems generally utilize light responsive control circuits for regulating shutters and/or aperture determining mechanisms. These mechanisms are configured to dynamically respond to certain electrical events generated by the control circuits. Typical of such electrical events is a change in the energization status of one or more electromagnets. While the light responsive circuits are now fabricable using efficient high volume integrated circuit techniques and the like, their assembly has still required the provision of discrete mechanically actuated switches which operate to perform select functions for an exposure control system. In addition to imposing added assembly steps, the mechanically actuated switches often must rely on the dynamic reliability of exposure regulating mechanisms. For instance, flash synchronization switches are usually operated in response to contact with some moving element of a shutter mechanism. A gradual deterioration of such moving elements over the lifetime of a camera may introduce exposure error as a result of inaccurately time switching. Extended use of the switches may also result in their contact members becoming pitted and the like so as to detract from the reliability of the photographic system.

Mechanical switching has been found unsatisfactory where multiple flash units are incorporated with a photographic camera. These units provide the convenience of eliminating the necessity of replacing a flashbulb after each of the series of flash illuminated exposures. Where several such flashbulbs are mounted in an array oriented toward a scene to be photographed, a circuit is provided which, upon being sequentially energized automatically causes the firing of only one flashbulb in the array, which flashbulb is next in the firing sequence. Mechanical switches have been found particularly unsatisfactory for use with such sequencing circuits because the switch contacts tend to bounce causing more than one firing signal to be applied to the circuit controlling the firing sequence of the bulbs. As a consequence, more than one of the flashbulbs may be needlessly fired in response to one actuation of a shutter mechanism. Where one source of electrical power is supplied for both the exposure control circuit and the array of flashbulbs, the principal and necessary powering switch for the exposure control system may also bounce to insert spurious firing signals into the flashbulb array.

SUMMARY OF THE INVENTION

The present invention is addressed to a fully electronic switching circuit which responds to an electrical event derived from an exposure control circuit to provide a switching function. The switching circuit is operable as a firing circuit for causing a selective energization of a photographic flashlamp from a power supply upon receipt of an electrical firing signal. This signal or event may be derived as a change in the energization level of an electromagnet.

In a preferred embodiment, the firing circuit of the invention is responsive to the de-energization of an electromagnet of an exposure control circuit to selectively actuate the circuit controlling the sequence of firing of an array of flashbulbs. The firing circuit of the invention eliminates a need for mechanically actuated flash firing switches and thereby overcomes the problems encountered with the bouncing of switch contacts. The circuit of the present invention, in addition, includes means operative at the end of the exposure interval for automatically terminating current flow through any flashbulbs which may become short circuited when fired in order to avoid excessive drain on the power supply to the system. This circuit further provides for the isolating of the effect of any bouncing of a main energization or power switch of an electronic exposure control system during the firing of select bulbs within an array of flashbulbs.

Accordingly, an object of the present invention is to provide an improved flash synchronization circuit.

Another object of the present invention is to provide an improved flash synchronization circuit for sequencially firing flashbulbs in an array in synchronism with sequential actuations of a camera shutter mechanism.

A further object of the present invention is to overcome the problem of switch bounce in a flash synchronization circuit for firing flashbulbs in sequence.

A still further object of the present invention is to prevent excessive drain of the power supply in a flash synchronization circuit should a flashbulb become shorted upon firing.

Further objects and advantages of the present invention will become readily apparent as the following detailed description of the invention unfolds and when taken in conjunction with the drawings.

DETAILED DESCRIPTION OF THE DRAWINGS:

The firing or switching circuit of the present invention operates in conjunction with an exposure control system wherein a mechanism responds to an electrical event deriving from a control circuit to regulate one or more exposure parameters such as exposure interval or relative aperture. Also responding to such electrical events, the switching circuit of the invention functions to insert a firing signal into the sequencing circuit of an array of flashbulbs. Since the control circuit deriving the controlled electrical events has a fixed circuit configuration, no spurious firing signals will be generated to cause unwanted activation of a flash array. Any switch bouncing encountered in a main circuit activating or power supply switch is also isolated by the system of the invention following each firing of a flashbulb within an array.

Figure 1:
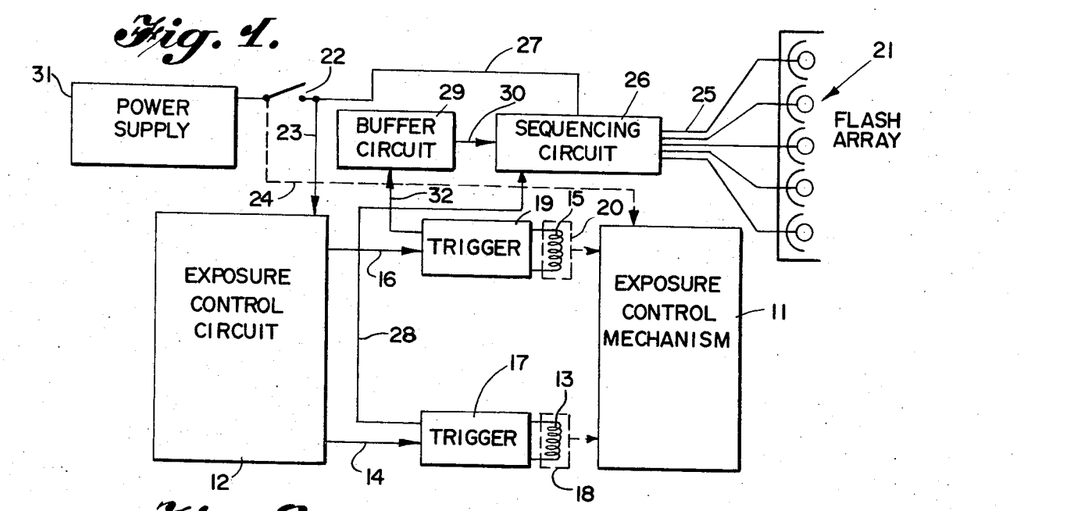
FIG. 1 is a block diagram illustrating the exposure control system of a camera incorporating a firing circuit for selectively energizing select bulbs from a flashlamp array according to the present invention.

Referring to FIG. 1 an exposure control system is shown in block from having an exposure control mechanism 11. This control mechanism comprises a shutter assembly which responds to one electrical event to uncover a previously determined exposure 119 and to another electrical event to cover that aperture. The effective interval between the uncovering and covering of the aperture represents an exposure interval. Control mechanism 11 is regulated from an exposure control circuit shown generally at 12. Control circuit 12 is powered from a central power supply 31 through a main energization switch 22 and input line 23. An exposure cycle is initiated upon the manual closure of the switch at 22. With the closure of switch 22, control circuit 12 responds to scene lighting to develop output signals in accordance with an exposure program relating the sensitometric characteristics of the film being exposed and scene lighting to present selectively timed output signals along lines 14 and 16. Lines 14 and 16 are coupled respectively with the inputs of two trigger circuits 17 and 19. Triggers 17 and 19 are of a Schmitt-type characterized in having a normally not conducting input stage and a normally conducting output stage. The normally conducting output stages of triggers 17 and 19 respectively are connected with the coils or windings 13 and 15 of electromagnets shown generally at 18 and 20. Electromagnets 18 and 20, when energized, retain select elements of the control mechanism 11 in initial positions. Release of these elements from the initial positions by selective de-energization of electromagnets 18 and 20 provides regulation over the opening and closing of its shutter mechanism as well as other exposure parameter components. Electromagnets 18 and 20 are de-energized respectively by trigger circuits 17 and 19 when these triggers received an input signal of predetermined level from exposure control circuit 12. Upon receipt of a signal of appropriate level, the normally not conducting stage of the trigger circuits will become conductive and the normally conducting stages will become nonconductive to de-energize their associated coil windings as at 13 and 15.

The control system discussed thus far is fully described and illustrated in a copending application for United States Pat., Ser. No. (Case 3724) entitled "Exposure Control System" by John P. Burgarella.

The system of FIG. 1 is also shown incorporating an array of flashbulbs as at 21 which are electrically coupled as along lines 25 to a sequencing circuit 26. Circuit 26 functions when energized in succession to cause the sequential firing of the flashbulbs positioned within flash array 21. Power is supplied to the circuit 26 and flash array 21 from power supply 31 through switch 22 and line 27. Sequencing circuit 26 is selectively fired from line 28 coupled with the output function of trigger circuit 17. Circuit 26 is selectively isolated from the operation of switch 22 following the firing of one flashbulb in the array 21 by a signal derived from a buffer circuit 29 produced along line 30. Buffer circuit 29 is selectively activated from line 32 coupled to one stage of trigger circuit 19. The operation of sequencing circuit 26 in conjunction with trigger circuit 17 and 19 and a buffer circuit 29 is detailed in the description to follow.

Figure 2:
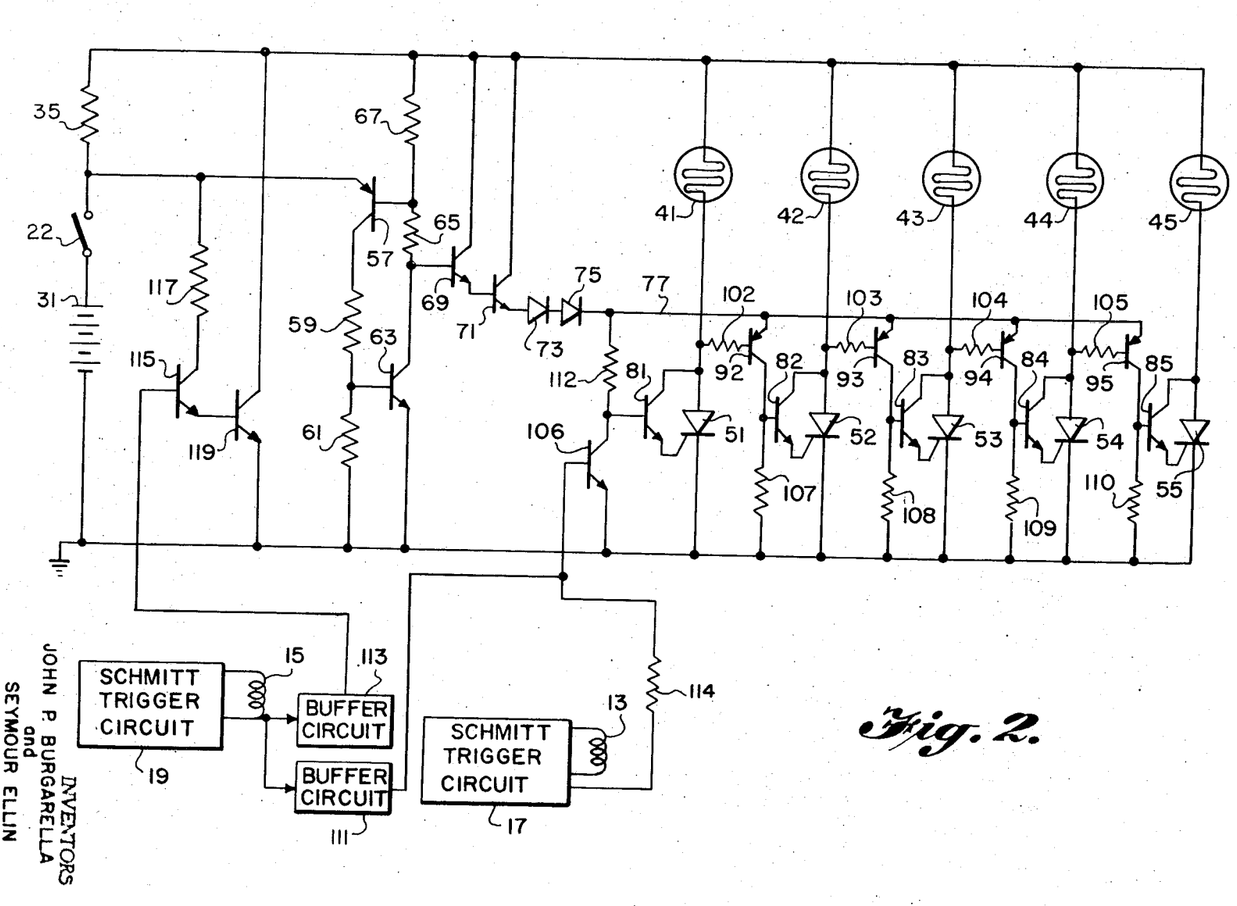
FIG. 2 is a circuit diagram illustrating the flash synchronization circuit of the present invention.

Referring to FIG. 2, the flash synchronization circuit 26 is illustrated in connection with Schmitt trigger 17 and 19. In addition to responding to the signals produced by the trigger circuit 17 and 19, the circuit 26 also responds to a pulse produced in coil 15 as a result of its de-energization by trigger circuit 19 as it causes the shutter mechanism at 11 to cover an exposure aperture and terminate an exposure. It will be recalled that trigger circuit 17 causes the initiation of an exposure by selectively de-energizing the winding 13 of an electromagnet. For convenience of illustration, power supply 31 is shown in FIG. 2 as a battery 31 and main power switch 22 is shown coupled with the positive terminal thereof. Power is applied to the flash synchronization circuit from battery 31, through switch 22 and a resistor 35 to one side of each of five flashbulbs 41 to 45 mounted in an array depicted earlier at 21. The negative side of the battery 31 is connected to ground. The flashbulbs 41 to 45 are connected in series with silicon controlled rectifiers 51 to 55, respectively, between the resistor 35 and ground. The switch 22, as pointed out above is closed by the operator before the start of an exposure interval. The operator will maintain the switch 22 closed until after the exposure interval has ended, at which time the operator will release the switch 22 to open the circuit.

The junction between the switch 22 and the resistor 35 is connected to the emitter of an PNP transistor 57, the collector of which is connected to ground through two resistors 59 and 61 connected in series. The junction between the resistors 59 and 61 is connected to the base of an NPN transistor 63, the emitter of which is connected to the negative terminal of the battery 31 and the collector of which is connected to the base of the transistor 57 through a resistor 65. The base of the transistor 57 is also connected to the junction between the resistor 35 and the flashbulbs 41 to 45. The collector of the transistor 63 is also connected to the base of an NPN transistor 69, the collector of which is connected to the junction between the resistor 35 and the flashbulbs 41 to 45 and the emitter of which is connected to the base of an NPN transistor 71. The collector of the transistor 71 is connected to the junction between the resistor 35 and the flashbulbs 41 to 45 and the emitter of the transistor 71 is connected through two series connected diodes 73 and 75 to a conductor 77. The diodes 73 and 75 are poled to permit current flow from the transistor 71 to the conductor 77.

The collectors of five NPN transistors 81 to 85 are connected to the anodes of the silicon controlled rectifiers 51 to 55, respectively, and the emitters of the transistors 81 to 85 are connected to the gates of the silicon controlled rectifiers 51 to 55, respectively. The emitters of four PNP transistors 92 to 95 are connected directly to the conductors 77 and the collectors thereof are connected to the bases of the transistors 82 to 85, respectively. The anodes of the silicon controlled rectifiers 51 to 54 are connected to the bases of the transistors 92 to 95 through resistors 102 to 105, respectively. The bases of the transistors 82 through 85 are connected to ground through resistors 107 through 110, respectively. The emitter of a transistor 106 is connected to ground and the collector of the transistor 106 is connected to the base of the transistor 81 and to the conductor 77 through a resistor 112.

The Schmitt trigger circuit 17 is connected to the base of the transistor 106 through a buffering resistor 114 and maintains the transistor 106 conducting while the Schmitt trigger circuit 17 is in the state in which it maintains current flow through the coil 13. Forward bias at transistor 106 is maintained during periods of energization of coil 13 by coupling its base electrode at a point within Schmitt trigger circuit 17 which provides a sufficiently high voltage level during these periods. When the Schmitt trigger circuit 17 is in the state in which it cuts off current flow through the coil 13, it causes the removal of forward bias from transistor 106.

The circuit combination of the Schmitt trigger circuit 19 and the coil 15 is connected through a buffer circuit 111 to the base of the transistor 106 and through a buffer circuit 113 to the base of an NPN transistor 115. The collector of the transistor 115 is connected through a resistor 117 to the junction between the switch 22 and the resistor 35 and the emitter of the transistor 115 is connected to the base of an NPN transistor 119, the collector of which is connected to the junction between the resistor 35 and the flashbulbs 41 to 45 and the emitter of which is connected to ground. The transistors 115 and 119 will normally not be conducting and are rendered conductive by a pulse applied thereto through the buffer circuit 113 at the end of the exposure interval. When current flow through the coil 15 is interrupted by the Schmitt trigger 19 at the end of the exposure interval, the coil 15 generates a brief pulse, preferably of about 250 microsecond, which is applied through the buffer circuit 111 to the base of the transistor 106 to turn the transistor 106 back on and through the buffer circuit 113 to the base of the transistor 115 to turn on the transistor 115 and the transistor 119.

When the switch 22 is closed just prior to the initiation of an exposure interval, the transistors 57 and 63 remain nonconductive and as a result the transistors 69 and 71 become conductive. As pointed out above, the transistors 115 and 119 are nonconductive at this time, whereas the transistor 106 becomes conductive when the switch 22 is closed. As a result of the transistor 106 being conductive, the transistor 81 is turned off as are each of the transistors 82 to 85 and the transistors 92 to 95. When the Schmitt trigger circuit 17 deenergizes the coil 13 causing the shutter mechanism to open to start the exposure interval, the Schmitt trigger circuit 17 removes the forward bias earlier established upon transistor 106 to switch it to a nonconductive state. As a result, current flows through the base of the transistor 81 turning the transistor 81 on causing current to flow through the flashbulb 41 and through the transistor 81 into the gate of the silicon controlled rectifier 51. As a result, the silicon controlled rectifier 51 is fired causing a large amount of current to flow through the flashbulb 41, thus firing the flashbulb 41.

A flashbulb by definition is a flashlamp with a filament which is consumed when fired. Accordingly, after a flashbulb has been fired it should normally present an open circuit between its terminals. The conduction through the silicon controlled rectifier 51 does not cause the transistor 92 to be turned on because the transistor 92 is back biased. While the flashbulb 41 is firing and conducting a large current, this current flows through the silicon controlled rectifier 51 and causes a resulting voltage drop across the silicon controlled rectifier 51. This current also flows through the resistor 35 and causes a voltage drop across the resistor 35. In addition, current from the junction between resistor 35 and the flashbulbs will flow through the transistor 71 and the diodes 73 and 75 and through the resistor 112 into the base of the transistor 81, providing a voltage drop across the transistor 71 and the diodes 73 and 75. During firing of a flashbulb before the flashbulb filament burns out or nears a burned out condition, the resistance of the flashbulb is low and the voltage drop across the transistor 71 and the diodes 73 and 75 will be greater than that across the flashbulb being fired. As a result, the transistor 92 is back biased while the flashbulb 41 is being fired before the flashbulb 41 nears burn out. The transistors 93 through 95 are also back biased since the silicon controlled rectifiers 52 through 54 are not conducting. Accordingly, one of the silicon controlled rectifier 52 to 55 are fired at this time.

When the flashbulb 41 is fired and current is drawn through it, the resulting voltage drop through the resistor 35 is transmitted to the base of the transistor 57 to cause the transistor 57 to start turning on. As the transistor 57 starts to turn on, the resulting conduction starts the transistor 63 to turn on. As the transistor 63 turns on, it further increases the conduction through the transistor 57 and a regenerative action quickly drives both the transistors 57 and 63 to a fully conducting state. This switching action turns off the transistors 69 and 71 cutting off the current flow to the conductor 77. This action happens before the flashbulb 41 nears burn out and opens the circuit between the silicon controlled rectifier 51 and the flashbulb 41. Thus, before the burn out of the flashbulb 41 can cause the transistor 102 to become forward biased, the current flow to transistor 102 from conductor 77 is cut off and, accordingly, the silicon controlled rectifier is not fired. As a result, for any given array of flashbulbs 41 to 45, the first time that the Schmitt trigger circuit 17 renders the transistor 106 nonconductive upon the interruption of current through the coil 13, only the first flashbulb 41 is fired.

It is desirable to have a means to interrupt current flow through the fired flashbulb other than by the burning out of the flashbulb because the fired flashbulb may leave a conducting residue or short circuit between the terminals of the flashbulb, and thus provide an excessive drain on the battery. This interruption is accomplished in the circuit of FIG. 2 by means of the pulse generated by the coil 15 when the current flow through the coil 15 is interrupted to close the shutter mechanism and end the exposure interval. When current flow through the coil 15 interrupted, the above-mentioned 250 microsecond pulse generated by the coil 15 is applied by the buffer circuit 113 to the transistor 115 to render the transistor 115 conducting for the duration of the pulse. This in turn renders the transistor 119 conductive for this period, thus shunting the series circuits of the flashbulbs and the silicon controlled rectifiers. This lowers the current through the shorted flashbulb and silicon controlled rectifier in series therewith to a point at which the silicon controlled rectifier switches off. No further current flows through this series circuit should the flashbulb 41 be shorted. Thus, should the flashbulb 41 be short circuited after firing, the current through the flashbulb 41 is nevertheless interrupted at the end of the exposure interval by the action of the transistor 119.

Attention is now directed to the phenomenon of a "-bouncing" of the contacts of switch 22. When these contacts are initially closed at the commencement of an exposure cycle, and a select bulb 41 to 45 of the array nears the termination of its ignition, the latching pair of transistors 57 and 63 will be "on" to hold line 77 in an "off" condition near ground level. Should the contacts of switch 22 bounce to an open status, transistors 57 and 63 will "unlatch" and assume their original nonconducting states. Should the contacts of switch 22 now rebound to a closed position, the next unfired flashbulb in the array 41 to 45 will be fired in normal sequence. Such further sequencing is prevented by the forward biasing of transistor 106 from buffer circuit 111. The latter forward bias remains throughout the energized status change of Schmitt trigger circuit 19, i.e., until the end of an exposure cycle.

After the switch 22 is opened and the shutter mechanism has been recocked, the system is then again ready to operate the shutter mechanism and fire the next one of the flashbulbs in sequence in synchronism with the exposure provided by the opening of the shutter mechanism. To commence an exposure cycle, the switch 22 is again closed and again remains closed throughout the exposure interval. The closure of the switch 22 then energizes the circuit shown in FIG. 2, and in addition, energizes the Schmitt triggers 17 and 19 so that they energize the coils 13 and 15. Then after closing the switch 22, the control circuit 12 will switch the Schmitt trigger 17 to the opposite state to de-energize the coil 13 causing the shutter mechanism to uncover the aperture and commence an exposure interval. Accordingly, the Schmitt trigger circuit 17 will again apply a signal removing the forward bias at transistor 106 rendering the transistor 106 nonconductive. As a result the transistor 81 will be rendered conductive and current will then flow through the transistor 71, the diodes 73 and 75, the emitter base circuit of the transistor 92, and through transistor 81 into the gate of the silicon controlled rectifier 51. Current will then flow from the conductor 77 through the emitter base circuit of the transistor 92 and the conducting silicon controlled rectifier 51 to ground, the flashbulb 41 being burned out and providing an open circuit. As a result of conduction through the transistor 92, the transistor 82 will begin to conduct and fire the silicon controlled rectifier 52. Current will then flow from the battery through the resistor 35 and then through the flashbulb 42 and through the silicon controlled rectifier 52 to fire the flashbulb 42. While the flashbulb 42 is being fired, the voltage drop across the transistor 71 and the diodes 73 and 75 will be greater than the voltage drop across the flashbulb 42, and as a result, the transistors 93 to 95 will all be back biased preventing firing of the additional silicon controlled rectifiers 53 to 55. As the current through the flashbulb 42 rises, the voltage at the junction between the resistor 35 and the flashbulbs will drop. As a result of this drop and the resulting regenerative action of the transistors 57 and 63, current flow through the transistors 69 and 71 will be cut off in the same manner as described above thus cutting off current flow to the conductor 77 and preventing any further silicon controlled rectifiers from being fired when the flashbulb 42 burns out. Then at the end of the exposure interval when the Schmitt trigger circuit 19 cuts off current flow through the coil 15, the above-mentioned 250 microsecond pulse will again be applied through the buffer circuit 113 to the base of the transistor 115 rendering the transistor 115 and the transistor 119 conductive. Thus the current through the silicon controlled rectifier 52 is reduced to its cut off point should the flashbulb 42 be shorted after it is fired rather than being open circuited. At the same time, the Schmitt trigger circuit 19 applies a signal through the buffer circuit 111 to render the transistor 106 conductive so that when the switch 22 is opened in response to the control 21 being released by the operator, any switch bounce will not cause the next silicon controlled rectifier 53 to fire.

When the switch 22 is again actuated after recocking the shutter mechanism, the circuitry will cause the silicon controlled rectifier 53 to fire, firing the flashbulb 43 in the similar manner as described above with respect to the flashbulb 42. Subsequent actuations of the switch 22 will cause firing of the flashbulbs 44 and 45 by firing the silicon controlled rectifiers 54 and 55 in a similar manner. Thus the circuit will fire the flashbulbs 41 to 45 in sequence in response to sequential actuations of the switch 22. Because the silicon controlled rectifiers 51 to 55 are fired in response to an output signal from the Schmitt trigger circuit which controls the energization of the coil 13 causing the shutter to open instead of an electric switch, there is no danger of electric switch bounce causing successive firing of more than one flashbulb in response to each actuation of the shutter mechanism. Moreover, excessive current drain on the battery is prevented if one of the flashbulbs should short upon being fired instead of opening the circuit between its terminals because the pulse applied to the transistors 115 and 119 from the Schmitt trigger circuit 19 and the coil 15 will cause the silicon controlled rectifier in series with the shorted flashbulb to turn off. Undesired firing of additional flashbulbs caused by bouncing of the switch 22 upon the opening thereof is prevented by the pulse applied to the transistor 106 from the Schmitt trigger circuit 19 through the buffer circuit 111 as described above.

Figure 3:
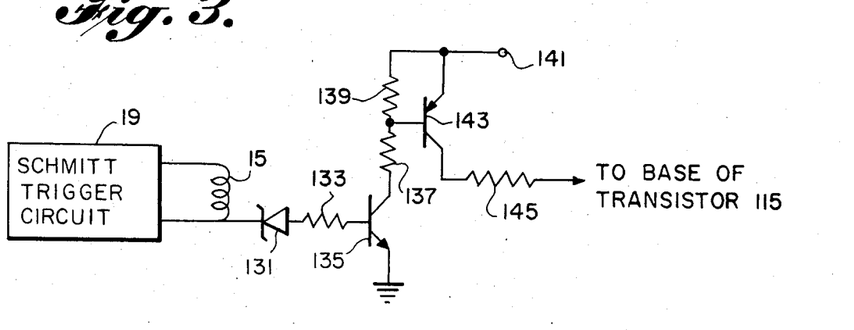
FIGS. 3 through 6 illustrate buffer circuits which are usable in the flash synchronization circuit of the present invention.
Figure 4:
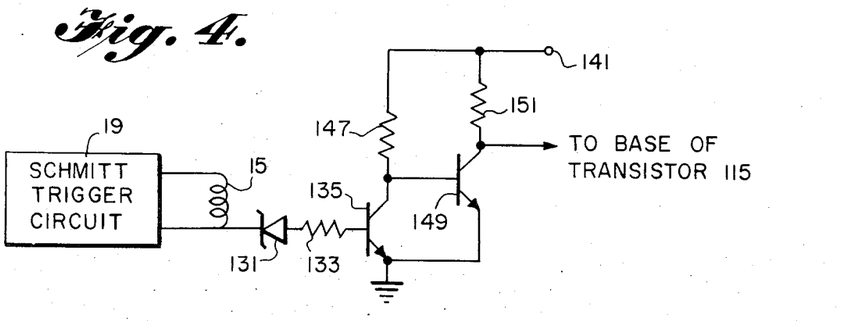
Figure 5:
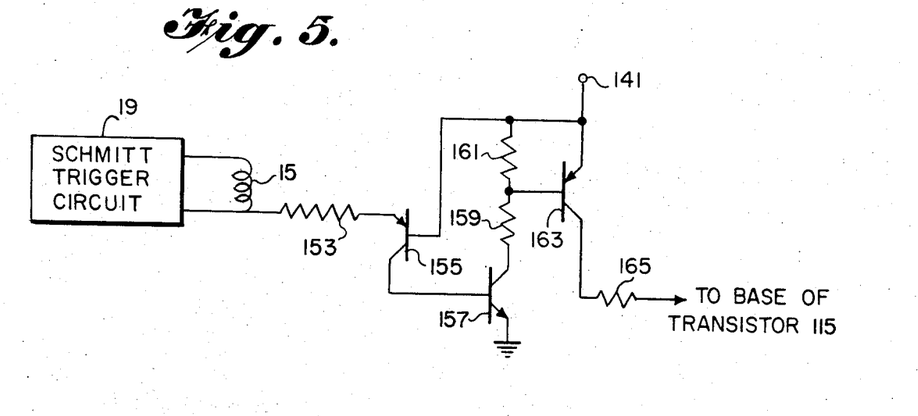

FIGS. 3, 4 and 5 illustrate three circuits which can be used for the buffer circuit 113 for driving the base of the transistor 115 with the 250 microsecond pulse. In the circuit of FIG. 3, one side of the coil 15 is connected through a zener diode 131 and a resistor 133 in series to the base of an NPN transistor 135. When the switch 22 is closed the opposite side of the coil 15 from that connected to the zener diode 131 is connected to the positive side of the battery 31 and when the Schmitt trigger circuit 19 is in a state in which it energizes the coil 15 current will flow through the coil 15 toward the side connected to the zener diode 131. When the Schmitt trigger circuit 19 cuts off the current flow through the coil 15 to end the exposure interval, a positive 250 microsecond pulse will be produced at the junction between the coil 15 and the diode 131. This pulse will break down the zener diode 131 and be applied through a resistor 133 to the base of the transistor 135. Zener diode 131 should be selected having a breakover level above the voltage level normally present at terminal 141.

The emitter of the transistor 135 is connected to ground and the collector of the transistor 135 is connected through resistors 137 and 139 connected in series to the positive side of the battery applied to terminal 141 through the switch 22 when the switch is closed. The junction between the resistors 137 and 139 is connected to the base of a PNP transistor 143, the emitter of which is connected to the plus voltage at terminal 141 and the collector of which is connected through a resistor 145 to the base of the transistor 115 in the flash sequence control circuit.

When the above-mentioned 250 microsecond pulse is applied to the base of the transistor 135 in response to the cut off of current flow through the coil 15 at the end of the exposure interval, the transistor 135 is rendered conductive and this in turn renders the transistor 143 conductive. The transistor 143 accordingly will apply current to the base of the transistor 115 to render the transistor 115 and therefore the transistor 119 conductive.

FIG. 4 illustrates an alternative buffer circuit 113. In this circuit, the zener diode 131, the resistor 133 and the NPN transistor 135 are connected to the Schmitt trigger 19 and coil 15 in the same manner that these components are connected in the circuit of FIG. 3. As in the circuit of FIG. 3, the emitter of the transistor 135 is connected to ground. The collector of the 135 is connected through a resistor 147 to the plus 6 volts applied to terminal 141 when the switch 22 is closed. The collector of the transistor 135 is also connected to the base of an NPN transistor 149, the emitter of which is connected to ground and the collector of which is connected through a resistor 151 to the plus 6 volts at terminal 141. The collector of the transistor 149 is also connected to the base of the transistor 115 in the circuit of FIG. 2.

As in the circuit of FIG. 3, a pulse will be applied to the base of the transistor 135 when the Schmitt trigger circuit 19 cuts off current flow through the coil 15 at the end of the exposure interval. This pulse will render the transistor 135 conductive which in turn will cut off the current flow through the transistor 149. As a result current will flow from the terminal 141 through the resistor 151 into the base of the transistor 115 to render the transistor 115 and the transistor 111 conductive.

FIG. 5 illustrates still another alternative embodiment of the buffer circuit 113. In this circuit, the side of the coil 15 toward which current flows when the coil 15 is energized is connected through a resistor 153 to the emitter of an PNP transistor 155. The base of the transistor 155 is connected directly to the terminal 141 to which plus 6 volts is applied when the switch 22 is closed. The collector of the transistor 155 is connected to the base of an NPN transistor 157, the emitter of which is connected to ground and the collector of which is connected through a series circuit of resistors 159 and 161 to the plus 6 volts applied at terminal 141. The junction between the resistors 159 and 161 is connected to the base of an PNP transistor 163, the emitter of which is connected to the plus 6 volts at terminal 141 and the collector of which is connected through a resistor 165 to the base of the transistor 115. When the current flow through the coil 15 is cut off by the Schmitt trigger circuit at the end of the exposure interval, the 250 microsecond pulse will be generated at the junction between the coil 15 and the resistor 153. This renders the transistor 155 conductive to thus render the transistor 157 conductive. Conduction through the transistor 157 renders the transistor 163 conductive to cause current to flow into the base of the transistor 115 and thus render the transistor 115 conductive.

Figure 6:
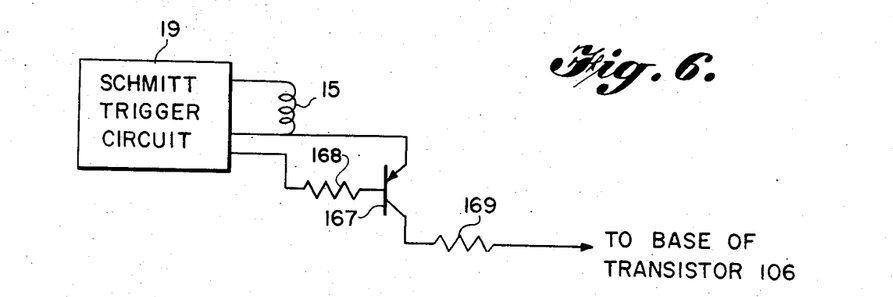

FIG. 6 illustrates the details of the buffer circuit 111 which renders the transistor 106 conductive at the termination of an exposure interval. As shown in FIG. 6, the terminal of the coil 15 toward which current flows when the coil 15 is energized is connected to the emitter of an PNP transistor 167. The base of the transistor 167 is connected to a bias voltage taken from the Schmitt trigger circuit 19 through resistor 168 to render the transistor 167 nonconductive before de-energization of coil 15. The collector of the transistor 167 is connected to the base of the transmitter 106 through a resistor 169. At the end of an exposure interval when the current flow is cut off through the coil 15, the voltage level at the appropriate output to terminal of Schmitt trigger 19 will be of sufficient level to forward bias transistor 106 into conduction. This level is maintained as long as the circuit is energized.

Figure 7:
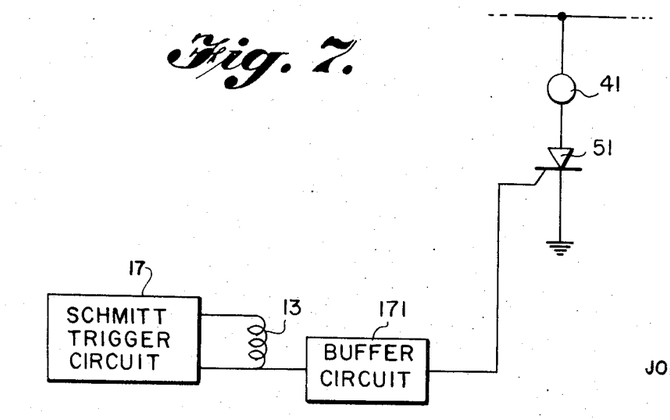
FIG. 7 illustrates an alternative embodiment for a portion of the circuit shown in FIG. 2.

In the above description, the silicon controlled rectifier 51 is gated in accordance with the state of the Schmitt trigger circuit 17 as shown in FIG. 2 so that the Schmitt trigger circuit 17 applies a gating signal via the transistors 106 and 81 to the silicon controlled rectifier 51 to tend to render it conductive when the Schmitt trigger circuit 17 is in a state de-energizing coil 13. As an alternate technique, the gate of the silicon controlled rectifier 15 could be driven in a manner similar to that in which the base of the transistor 115 is driven. A circuit for driving the gate of the silicon controlled rectifier 51 in this manner is shown in FIG. 7. In this circuit use is made of a 250 microsecond pulse when its energization is cut off by the Schmitt trigger 17 generated by the coil 13. This pulse is applied via a buffer circuit 171 to the gate of the silicon controlled rectifier 51. The remainder of the circuitry of FIG. 2 is the same except that the buffer circuit 111, the transistors 81 and 106, and the resistors 112 and 114 are eliminated. Any one of the buffer circuits shown in FIGS. 3–5 could be provided at 171 between the silicon controlled rectifier 51 and the coil 13. It will be apparent that the drive from the Schmitt trigger circuit 19 through the buffer circuit 111 is not needed. Thus, with this circuit switch bounce when the switch 22 is opened after an exposure interval is not a problem.

Instead of the Schmitt trigger circuits, other equivalent electronic circuits, such as multivibrators, either unistable or bistable, could be used. The circuit should have two states which are at least semistable and between which the circuit can be switched. The circuit should exhibit the same fixed circuit configuration in both states. In other words, the switching between states should not require movement in the circuit of a switch contact such as in a relay circuit because of the problem of switch contact bounce.

The above description is of preferred embodiments of the invention and many modifications may be made thereto without departing from the spirit and scope of the invention, which is defined in the appended claims.

We claim:

1. A flash synchronization circuit for synchronizing the sequential firing of a plurality of flashbulbs, grouped in an array, with sequential actuations of a camera shutter mechanism comprising:

a firing circuit for firing said flashbulbs in sequence in response to firing signals applied thereto in sequence, firing at least one of said flashbulbs in response to each applied firing signal, electronic circuit means having a fixed circuit configuration, having first and second electrical states which are at least semistable, being unstable between said first and second electrical states, and being operable to switch between said first and second states in response to applied threshold signal levels, said shutter mechanism including means to open and close such shutter to define an exposure interval in a predetermined timed relationship with the switching of said electronic circuit means from said first state to said second state, said electronic circuit means generating a firing signal and applying such firing signal to said firing circuit when said electronic circuit means switches from said first state to said second state.

2. A flash synchronization circuit as recited in claim 1 wherein said circuit means controls the energization of an electrical coil electromagnetically acting on said shutter mechanism to effect a regulation thereof, said electronic circuit means de-energizing said coil upon switching from said first state to said second state, said firing signals each comprising the pulse that is generated by said coil when said coil is de-energized.

3. A flash synchronization circuit as recited in claim 1 wherein said circuit means comprises a Schmitt trigger circuit having a first stable state and a second stable state and wherein said circuit means applies said firing signal to said input of said sequence firing circuit when said Schmitt trigger circuit switches to said second stable state.

4. A flash synchronization circuit as recited in claim 1 wherein said circuit means normally energizes a coil, wherein said means to open said shutter mechanism opens said shutter mechanism in response to the de-energization of said coil, and wherein said firing signal comprises a pulse generated by said coil when said coil is de-energized.

5. A flash synchronization circuit as recited in claim 1 wherein said sequence firing circuit comprises a plurality of electronic valves each connected in series with a different one of said flashbulbs, said valves being of the type which are rendered conductive in response to a signal applied to a gate electrode thereof and which remain conductive until rendered nonconductive by the current flowing therethrough dropping below a minimum value, and means to render the electronic valve in series with the next flashbulb to be fired conductive in response to said firing signal being applied to said input.

6. A flash synchronization circuit as recited in claim 5 wherein said shutter mechanism includes means to close said shutter mechanism to terminate said exposure interval a time interval after said shutter mechanism has been opened, and wherein said sequence firing circuit includes means to render said electronic valves nonconducting when said exposure interval is terminated.

7. A flash synchronization circuit as recited in claim 6 further comprising a coil, means to energize said coil and to de-energize said second coil, said means to close said shutter mechanism to terminate said exposure interval operating in response to the de-energization of said coil, said means to render said electronic valves nonconductive operating in response to the pulse generated by said coil when said coil is de-energized.

8. A flash synchronization circuit as recited in claim 5 wherein said shutter mechanism includes means to close said shutter mechanism at the end of said exposure interval after said shutter mechanism has been opened by said means to open said shutter mechanism, and wherein there is provided means to prevent said electronic valves from being rendered conductive when said exposure interval is being terminated.

9. A flash synchronization circuit as recited in claim 5 wherein said electronic valves comprise silicon controlled rectifiers.

10. A flash synchronization circuit as recited in claim 9 wherein said shutter mechanism includes means to close said shutter mechanism to terminate said exposure interval a time interval after said shutter mechanism has been opened, and wherein said sequence firing circuit includes means to render said silicon controlled rectifiers nonconducting when said exposure interval is terminated.

11. A flash synchronization circuit as recited in claim 10 further comprising a coil, means to energize said coil and to de-energize said coil, said means to close said shutter mechanism to terminate said exposure interval operating in response to the de-energization of said coil, said means to render said silicon controlled rectifiers nonconductive operating in response to the pulse generated by said coil when said coil is de-energized.

12. A flash synchronization circuit as recited in claim 9 wherein said shutter mechanism includes means to close said shutter mechanism at the end of said exposure interval after said shutter mechanism has been opened by said means to open said shutter mechanism, and wherein there is provided means to prevent silicon controlled rectifiers from being fired when said exposure interval is being terminated.

13. A flash synchronization circuit for synchronizing the sequential firing of flashbulbs in an array of said flashbulbs with sequential actuations of a camera shutter mechanism, said camera shutter mechanism including means to open said shutter mechanism to start an exposure interval and to close said shutter mechanism at the end of said exposure interval, comprising a plurality of electronic valves each connected in series with a single different one of said flashbulbs, said electronic valves being of the type which are rendered conductive in response to a gating signal applied to a gate electrode thereof and which remain conductive until rendered nonconductive by the current flowing therethrough dropping below minimum value, means to apply a gating signal to the gate electrode of the one of said electronic valves in series with the next unfired one of said flashbulbs in said sequence at the start of said exposure interval, and means to reduce the current flow through one of said electronic valves below said minimum at the end of said exposure interval.

14. A flash synchronization circuit as recited in claim 13 further comprising a coil, means to energize said coil and to de-energize said coil, said means to close said shutter mechanism to terminate said exposure interval operating in response to the de-energization of said coil, said means to reduce the current flow through said one of said electronic valves operating in response to the pulse generated by said coil when said coil is de-energized.

15. A flash synchronization circuit as recited in claim 13 wherein said means to reduce the current flow through said one of said electronic valves comprises a circuit shunting the series circuits of said flashbulbs and said electronic valves, said shunting circuit becoming conductive at the end of said exposure interval.

16. A flash synchronization circuit as recited in claim 13 wherein said electronic valves comprise silicon controlled rectifiers.

17. A flash synchronization circuit for synchronizing the firing of flash bulbs with sequential actuations of a camera shutter mechanism comprising:

a firing circuit for selectively firing at least one said flash bulb from a power supply upon receipt of an electrical firing signal applied to the input thereof, said shutter mechanism including means to open and close said shutter mechanism to define an exposure interval, and electronic circuit means controlling the energization of an electrical coil electromagnetically acting on said shutter mechanism to effect a regulation thereby, said circuit means de-energizing said coil at a predetermined time relative to said exposure interval, causing said coil to generate a pulse as a result of the de-energization thereof, and applying said pulse as said firing signal to said firing circuit.

* * * * *